US009456421B2

(12) United States Patent
Pan et al.

(10) Patent No.: US 9,456,421 B2
(45) Date of Patent: Sep. 27, 2016

(54) UPLINK POWER CONTROL METHOD, DEVICE AND SYSTEM

(71) Applicant: CHINA ACADEMY OF TELECOMMUNICATIONS TECHNOLOGY, Beijing (CN)

(72) Inventors: Xueming Pan, Beijing (CN); Mei Liu, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 36 days.

(21) Appl. No.: 14/387,229

(22) PCT Filed: Mar. 18, 2013

(86) PCT No.: PCT/CN2013/072827
§ 371 (c)(1),
(2) Date: Jan. 7, 2015

(87) PCT Pub. No.: WO2013/139245
PCT Pub. Date: Sep. 26, 2013

(65) Prior Publication Data
US 2015/0110023 A1    Apr. 23, 2015

(30) Foreign Application Priority Data

Mar. 22, 2012 (CN) .......................... 2012 1 0078398

(51) Int. Cl.
*H04W 52/04* (2009.01)
*H04W 52/24* (2009.01)
(Continued)

(52) U.S. Cl.
CPC .......... *H04W 52/04* (2013.01); *H04W 52/244* (2013.01); *H04W 52/281* (2013.01); *H04W 52/58* (2013.01); *H04W 52/146* (2013.01); *H04W 52/226* (2013.01)

(58) Field of Classification Search
None
See application file for complete search history.

(56) References Cited

U.S. PATENT DOCUMENTS 8,634,369 B2 *  1/2014  Ahn ..................... H04B 7/0689
                                                    370/329
2011/0195735 A1   8/2011  Irmer et al.
(Continued)

FOREIGN PATENT DOCUMENTS

CN          1697341 A      11/2005
CN        101567713 A      10/2009
(Continued)

OTHER PUBLICATIONS

Office Action for corresponding Korean Patent Application No. 10-2014-7029452, 9 pp., (Jul. 3, 2015).
3GPP, "LTE; Evolved Universal Terrestrial Radio Access (E-UTRA); Physical Layer Procedures (3GPP TS 36.213 Version 10.1.0 Release 10)", ETSI TS 136 213 V10.1.0, 117 pp., (Apr. 2011).
European Patent Office Communication enclosing Extended European Search Report for corresponding European Patent Application No. 13765160.0, 7 pp., (May 29, 2015).
(Continued)

*Primary Examiner* — Hong Cho
(74) *Attorney, Agent, or Firm* — Blakely, Sokoloff, Taylor & Zafman LLP (57) ABSTRACT

Disclosed are an uplink power control method, device and system. The method comprises the steps of: a network-side device configuring at least two sets of uplink power control parameters for an uplink signal of user equipment; and notifying the user equipment of each set of configured uplink power control parameters for user equipment to determine the transmitting power of the uplink signal. The technical solution of the present invention is used for flexibly controlling the uplink transmitting power.

18 Claims, 3 Drawing Sheets

(51) Int. Cl.
*H04W 52/28* (2009.01)
*H04W 52/58* (2009.01)
*H04W 52/14* (2009.01)
*H04W 52/22* (2009.01)

(56) References Cited

U.S. PATENT DOCUMENTS

2011/0235582 A1* 9/2011 Chen .................. H04W 52/243
370/328
2011/0243007 A1* 10/2011 Xiao .................... H04B 7/0447
370/252

FOREIGN PATENT DOCUMENTS

| CN | 101754338 A | 6/2010 |
| WO | WO 2011/119973 A1 | 9/2011 |
| WO | WO 2011/120437 A1 | 10/2011 |
| WO | WO 2011/127435 A1 | 10/2011 |
| WO | WO 2011/130432 A1 | 10/2011 |
| WO | WO 2011/155711 A2 | 12/2011 |
| WO | WO 2013/014332 A1 | 1/2013 |

OTHER PUBLICATIONS

PCT Written Opinion of the International Search Authority for PCT Counterpart Application No. PCT/CN2013/072827, 19 pp. (including English translation), (Jun. 27, 2013).
PCT Notification Concerning Transmittal of International Preliminary Report on Patentability (Chapter I of the Patent Cooperation Treaty) for PCT Counterpart Application No. PCT/CN2013/072827, 22 pp. (including English translation), (Oct. 2, 2014).
PCT International Search Report for PCT Counterpart Application No. PCT/CN2013/072827, 5 pages, (Jun. 27, 2013).
Office Action for corresponding Japanese Patent Application No. 2015-500754, 5 pp., (Sep. 8, 2015).
CMCC, "Discussion on Further Enhancements to LTE TDD for Dynamic TDD UL-DL Configuration", 3GPP TSG-RAN WG1 #68, R1-120641, Dresden, Germany, 5 pp., (Feb. 6-10, 2012).

* cited by examiner

UPLINK POWER CONTROL METHOD, DEVICE AND SYSTEM

CROSS-REFERENCE TO RELATED APPLICATIONS

This patent application is a U.S. National Stage Application under 35 U.S.C. §371 of International Application No. PCT/CN2013/072827, filed on Mar. 18, 2013, entitled UPLINK POWER CONTROL METHOD, DEVICE AND SYSTEM, designating the United States, and claiming priority to Chinese Patent Application No. 201210078398.1, filed with the Chinese Patent Office on Mar. 22, 2012 and entitled "Uplink power control method, device and system", the content of which was incorporated by reference in its entirety.

FIELD

The present invention relates to the field of communications and particularly to an uplink power control method, device and system.

BACKGROUND

In a Time Division Duplex (TDD) system, uplink transmission and downlink transmission can use the same frequency resources and different time resources, that is, uplink data and downlink data is transmitted in different sub-frames. In common TDD systems including a Time Division-Synchronous Code Division Multiple Access (TD-SCDMA) system and a Time Division-Long Term Evolution (TD-LTE) system, the partitions of uplink sub-frames and downlink sub-frames are statically or semi-statically, and it is common to determine a partition scheme of uplink and downlink sub-frames during a network planning according to the type of a cell and a rough proportion of traffic and keep the partition scheme unchanged. This is a simple and effective method in the context of large coverage by a macro cell. However an increasing number of low-power base stations including a pico cell, a home NodeB, etc., have been used to provide small local coverage along with the advancement of technologies, and there are a smaller number of User Equipments (UEs) and a significant change in UE's traffic requirements in these cells, thus the configuration of uplink sub-frames and downlink sub-frames is needed to varied dynamically as needed. Moreover inter-cell interference across uplink and downlink time slots may be obviated by synchronization and the same configuration of uplink and downlink sub-frames throughout the traditional TDD network, and particularly if an adjacent cell uses a sub-frame for an uplink transmission, then a current cell can't use this sub-frame for the downlink transmission but only can set this sub-frame as an uplink sub-frame or idle. Due to different conditions of traffic in the respective cells, the operation of the real network may be greatly restricted due to this traditional practice in that the respective cells can't select the configuration scheme of uplink sub-frames and downlink sub-frames dependent upon their own real-time conditions of traffic, thus lowering the ratio of utilizing system resources of the TDD network.

In view of the problem above, some more flexible configuration solutions of uplink and downlink sub-frames have gain attention, and in such solutions, a cell in the TDD network can select a different configuration scheme of uplink and downlink sub-frames as needed, and can adapt flexibly the configuration scheme of uplink and downlink sub-frames in accordance with a dynamic change in traffic to thereby improve the ratio of utilizing system resources.

Figure 1:
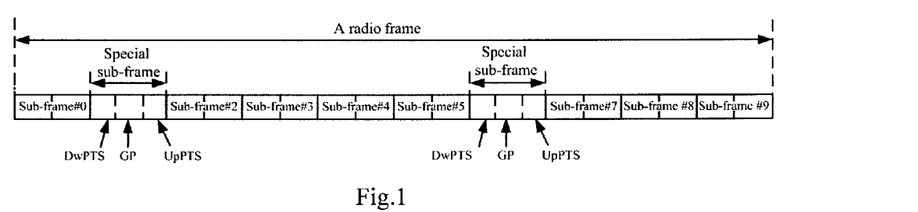
FIG. 1 illustrates a schematic structural diagram of a radio frame in the prior art.

A frame structure of the TD-LTE system in the prior art is as illustrated in FIG. 1, where the length of a radio frame is 10 ms, which includes 10 sub-frames, each of which is 1 ms in length. The sub-frames in the radio frame include special sub-frames and normal sub-frames, where the normal sub-frames include uplink sub-frames and downlink sub-frames for transmitting uplink/downlink control signaling, traffic data, etc., and the special sub-frames each include three time slots, which are a Downlink Pilot Time Slot (DwPTS), a GP and an Uplink Pilot Time Slot (UpPTS), the DwPTS being for transmitting a Primary Synchronized Signal (PSS), a Physical Downlink Control Channel (PDCCH), a Physical Hybrid Automatic Repeat Request (HARQ) Indication Channel (PHICH), a Physical Control Format Indication Channel (PCFICH), a Physical Downlink Shared Channel (PDSCH), etc., the GP being a guard period between the downlink and the uplink, and the UpPTS being for transmitting a Sounding Reference Signal (SRS), a Physical Random Access Channel (PRACH), etc. Particularly a radio frame can be configured with two special sub-frames (the sub-frames #1 and #6) or can be configured with a special sub-frame (the sub-frame #1), and the sub-frame #0 and the sub-frame #5, and the DwPTS time slot(s) in the special sub-frame(s) are usually used for downlink transmission, the sub-frame #2 and the UpPTS time slot(s) in the sub-frame(s) are usually used for uplink transmission, and the remaining sub-frames can be configured for uplink transmission or downlink transmission as needed.

In the TD-LTE system, the lengths of three time slots DwPTS, GP and UpPTS in a special sub-frame are allocated to support different configuration conditions, as depicted in Table 1:

TABLE 1

| Configuration | Normal CP | | | Extended CP | | |
| --- | --- | --- | --- | --- | --- | --- |
| No. | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

In Table 1, the length unit is $T_s$, where $T_s=1/(15000\times 2048)$ second. In the existing TD-LTE system, seven different allocation schemes of uplink and downlink sub-frames are supported with their particular configuration parameters as depicted in Table 2, where D represents downlink transmission, U represents uplink transmission, and S represents that this sub-frame is a special sub-frame:

TABLE 2

| Configuration No. | Switch periodicity | Sub-frame index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Where the configuration scheme of sub-frames is broadcasted by the network side to all of UEs in a cell in System Information (SI), and a change to the configuration scheme of sub-frames by using a modification to the system information is supported in the TD-LTE standard, but this modification necessitates procedures of paging, reading the system information again, etc., and the performance of the system may be degraded seriously if the configuration scheme of sub-frames is changed frequently. Moreover the shortest modification periodicity of frame configuration of 640 ms is supported in the TD-LTE standard, which has failed to fully accommodate a dynamically varying requirement for traffic.

Figure 2:
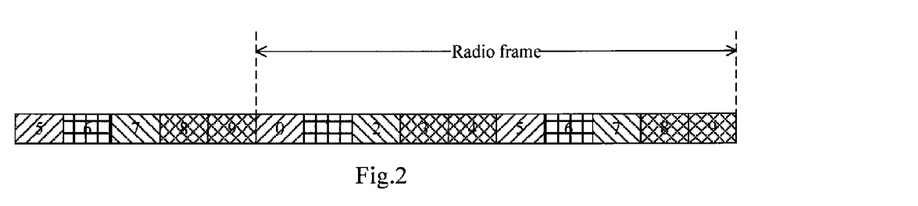
FIG. 2 illustrates a dynamic configuration scheme of uplink and downlink sub-frames in the prior art.

In view of this, a more flexible TDD frame structure has been proposed in the prior art to support more dynamic reconfiguration of uplink and downlink sub-frames so as to accommodate dynamically varying traffic. Particularly in a specific period of time, four types of sub-frames are set, including sub-frames always used for downlink transmission (referred to as constant downlink sub-frames), sub-frames always used for uplink transmission (referred to as fixed uplink sub-frames), special sub-frames, and sub-frames flexibly allocated for uplink or downlink transmission, where the sub-frames flexibly allocated for uplink or downlink transmission are referred to as flexible sub-frames, and if a flexible sub-frame is used for uplink transmission, then the flexible sub-frame is referred to as a flexible uplink sub-frame, or if a flexible sub-frame is used for downlink transmission, then the flexible sub-frame is referred to as a flexible downlink sub-frame. As illustrated in FIG. 2, the period of time above is a radio frame, where the sub-frames #0 and #5 are fixed downlink sub-frames, the sub-frames #2 and #7 are fixed uplink sub-frames, the sub-frames #1 and #6 are special sub-frames, and the remaining sub-frames (the sub-frame #3, the sub-frame #4, the sub-frame #8 and the sub-frame #9) are flexible sub-frames. The flexible sub-frames can be configured dynamically by the base station in view of a real-time traffic demand and a real-time channel condition to accommodate a dynamic change in traffic demand.

Figure 3:
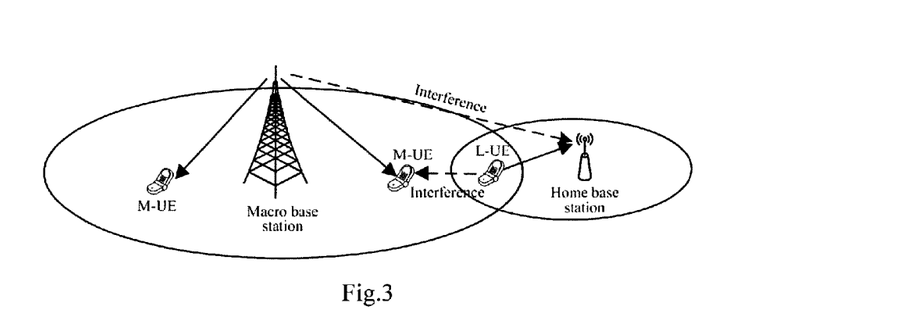
FIG. 3 illustrates a schematic diagram of interference across time slots in the prior art.

In the flexible configuration solution above of uplink and downlink sub-frames, although uplink and downlink sub-frames may be configured flexibly to dynamically varying traffic, serious interference across timeslots may arise, including interference between base stations and interference between UEs, as illustrated in FIG. 3, where an M-UE represents a UE served by a macro base station, and an L-UE represents a UE served by a home base station. A study showed that interference with a larger influence upon the performance of the system is interference between base stations, that is, uplink reception by a current base station may be subject to interference of downlink transmission by an adjacent base station, so that the performance of uplink transmission by a UE served by the current base station may be deteriorated seriously.

Uplink power can be controlled to improve the performance of uplink transmission. Wherein the power control as a fundamental technology in a wireless communication system serves to compensate for an influence of fading over a radio channel, so that a signal can arrive at a receiver at appropriate power in such a way that transmit power can be lowered at a transmitter when there is a good condition of the channel and can be increased at the transmitter when there is a poor condition of the channel to thereby guarantee the performance of reception so that a signal to noise ratio at the receiver is maintained in a relatively constant range. With a reasonable power control scheme, power consumption at the transmitter can be lowered on one hand and interference between UEs in a cell can be avoided on the other hand to thereby improve the performance of transmission and the capacity of the system. Moreover mutual interference between cells can be controlled. General power control schemes can include open-loop power control, closed-loop power control, inner-loop power control, outer-loop power control, etc. Uplink power is controlled in the LTE system by open-loop estimation in combination with closed-loop adjustment, where the open-loop section involves determination of an initial value of uplink transmit power by a UE from an uplink power control parameter (e.g., a target value of received power) configured at the network side, and then real-time closed-loop adjustment is performed on uplink transmit power in response to a power control command issued by a base station.

In the traditional TD-LTE system with synchronization and the same configuration scheme of uplink and downlink sub-frames throughout the network, there will be no interference across time slots, and uplink transmission by a cell will be subjected only to interference of uplink transmission in an adjacent cell, so an uplink power control parameter, which is determined by the deployment of the network, will be applicable to all the uplink and downlink sub-frames. There are two types of uplink sub-frames in the dynamic TDD system, which include fixed uplink sub-frames and those sub-frames among flexible sub-frames allocated for uplink transmission (i.e., flexible uplink sub-frames). There may be different interference conditions in these two types of uplink sub-frames, where the interference condition in the first type of uplink sub-frames is the same as that in the traditional TD-LTE system because a current cell will be subjected only to interference of uplink transmission of an adjacent cell; and in the second type of uplink sub-frames uplink transmission of the current cell may be subjected to persistent interference of downlink transmission of the adjacent cell at a significantly higher interference level than that in the first type of uplink sub-frames, and moreover since uplink or downlink transmission is performed flexibly by the adjacent cell in the respective ones of the second type of uplink sub-frames, there may also be significantly different interference conditions between the respective sub-frames.

As can be apparent from the description above, there may be greatly varying transmit power of the UE required in the respective types of uplink sub-frames in the dynamic TDD system. In order to guarantee the performance of transmission by the UE in the respective types of uplink sub-frames in the dynamic TDD system, transmit power in the different uplink sub-frames can be adjusted by a power control command word, but a narrow dynamic range of the power control command word, typically within ±2 dB, may not satisfy the requirement; and moreover respective UEs can be particularly configured with a uniform uplink power control parameter corresponding to transmit power, which results in unnecessary power consumption by the UEs and inter-cell interference in some other sub-frames (e.g., downlink sub-frames). Thus uplink transmit power can not be controlled flexibly without power consumption and interference in the prior art.

SUMMARY

Embodiments of the invention provide an uplink power control method, device and system to thereby control flexibly uplink transmit power of an uplink sub-frame.

Technical solutions according to the embodiments of the invention are as follows:

An uplink power control method includes:

configuring, by a network-side device, an uplink signal of a user equipment with at least two sets of uplink power control parameters; and notifying the user equipment of the configured respective sets of uplink power control parameters for the user equipment to determine transmit power of the uplink signal.

A network-side device includes:

a set of control parameters configuration unit, configured to configure an uplink signal of a user equipment with at least two sets of uplink power control parameters; and a set of control parameters transmission unit, configured to notify the user equipment of the respective sets of uplink power control parameters configured by the set of control parameters configuration unit for the user equipment to determine transmit power of the uplink signal.

An uplink power control method includes:

obtaining, by a user equipment, respective sets of uplink power control parameters, corresponding to an uplink signal, notified of by a network-side device;

when the user equipment needs to transmit the uplink signal, selecting, by the user equipment, one of the respective sets of uplink power control parameters obtained by the network-side device; and determining transmit power of the uplink signal from the selected set of uplink power control parameters.

A user equipment includes:

a set of control parameters obtainment unit, configured to obtain respective sets of uplink power control parameters, corresponding to an uplink signal, notified of by a network-side device;

a set of control parameters selection unit, configured to select one of the respective sets of uplink power control parameters obtained by the set of control parameters obtainment unit when the user equipment needs to transmit the uplink signal; and a transmit power determination unit, configured to determine transmit power of the uplink signal from the set of uplink power control parameters selected by the set of control parameters selection unit.

An uplink power control system includes:

a network-side device, configured to configure an uplink signal of a user equipment with at least two uplink power control parameters and to notify the user equipment of the configured respective sets of uplink power control parameters; and the user equipment, configured to select one of the respective sets of uplink power control parameters notified of by the network-side device and to determine transmit power of the uplink signal from the selected set of uplink power control parameters when the user equipment needs to transmit the uplink signal.

In the technical solutions according to the embodiments of the invention, the network-side device configures an uplink signal of the UE with at least two sets of uplink power control parameters and notifies the UE of the configured respective sets of uplink power control parameters, and when the UE needs to transmit the uplink signal, the UE can select one of the respective sets of uplink power control parameters notified of by the network-side device and determine transmit power of the uplink signal from the selected set of uplink power control parameters. In the dynamic TDD system, the UE can transmit an uplink signal in different uplink sub-frames and the UE can determine transmit power, at which the uplink signal is transmitted, from the different sets of uplink power control parameters so that the different uplink sub-frames can correspond to different transmit power to thereby ensure the performance of transmission by the UE in the respective uplink sub-frames of the dynamic TDD system. Moreover in the technical solutions according to the embodiments of the invention, the network side can configure at least two sets of uplink power control parameters instead of adjusting transmit power by a power control command word to thereby accommodate a dynamic demand for traffic, and moreover respective UEs will not be configured with a uniform uplink power control parameter to thereby avoid also power consumption of the UEs and inter-cell interference so as to control flexibly uplink transmit power.

DETAILED DESCRIPTION OF THE EMBODIMENTS

A general implementation principle and particular implementations of the technical solution according to the embodiments of the invention as well as their corresponding achievable advantageous effects will be described below in details with reference to the respective drawings.

Embodiments of the invention propose an uplink power control method generally involving an uplink power control process at the network side and an uplink power control at the UE side, and firstly the uplink power control process at the network side will be described below.

First Embodiment

Figure 4:
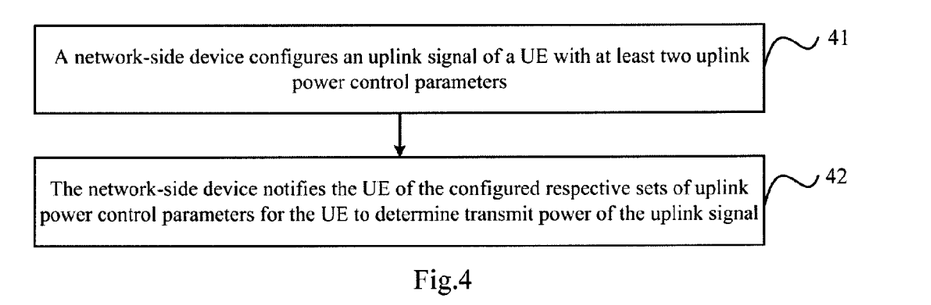
FIG. 4 illustrates a schematic flow chart of an uplink power control method at the network side according to a first embodiment of the invention.

As illustrated in FIG. 4 which is a schematic flow chart of an uplink power control method at the network side according to a first embodiment of the invention, a particular process flow thereof is as follows:

In the step 41, a network-side device configures an uplink signal of a UE with at least two uplink power control parameters.

In the first embodiment of the invention, the network-side device can be but will not be limited to a base station.

The uplink signal can be but will not be limited to a Physical Uplink Shared Channel (PUSCH), or a Physical Uplink Control Channel (PUCCH) or an SRS.

The uplink power control parameter of the uplink signal are used for the UE to determine transmit power of the uplink signal, and in the first embodiment of the invention, the uplink power control parameters of the uplink signal can be but will not be limited to a target value of received power of the uplink signal.

If the uplink signal is a PUCCH, the uplink power control parameters of the PUCCH are target values PO_PUCCH of received power of the PUCCH, the unit of which is dBm, where PO-PUCCH is the sum of a cell-specific component PO_NOMINAL_PUCCH and a UE-specific component PO_UE_PUCCH, i.e., PO_PUCCH=PO_NOMINAL_PUCCH+PO_UE_PUCCH. PO_NOMINAL_PUCCH is configured by a system broadcast parameter, and PO_UE_PUCCH is configured by UE-specific higher-layer signaling.

If the uplink signal is a PUSCH, the uplink power control parameters of the PUSCH are target values PO_PUSCH (j) of received power of respective categories of PUSCHs, the unit of which is in dBm, where j represents a category identifier of PUSCH and takes the values of 0, 1 or 2, where j=0 corresponds to transmission or retransmission of a PUSCH without an uplink (UL) grant, j=0 corresponds to transmission or retransmission of a PUSCH with a UL grant, and j=2 corresponds to transmission of a PUSCH with a random access message 3. The PO_PUSCH (j) is the sum of a 8-bit cell-specific component PO_NOMINAL_PUSCH(j) and a 4-bit UE-specific component PO_UE_PUSCH(j), i.e., PO_PUSCH(j)=PO_NOMINAL_PUSCH(j)+PO_UE_PUSCH(j), where PO_NOMINAL_PUSCH(j) is configured by a system broadcast parameter, and PO_UE_PUSCH(j) is configured by UE-specific higher-layer signaling. If the system is a multi-carrier system, then the UE may transmit the PUSCH over one or more carriers, where each carrier over which the PUSCH is transmitted corresponds to a target value of received power, and if the UE transmits the PUSCH over a component carrier c, then the target value of received power of the PUSCH over the component carrier c is PO_PUSCH, c(j).

Since target values of received power of an SRS multiplex the target values of received power of the PUSCH, if the uplink signal is an SRS, then the uplink power control parameters of the SRS are also PO_PUSCH (j).

As can be apparent from the description above, when the uplink signal is a PUCCH, each set of uplink power control parameters includes only PO_PUCCH, and when the uplink signal is a PUSCH or an SRS, each set of uplink power control parameters includes PO_PUSCH(0), PO_PUSCH(1) and PO_PUSCH(2) respectively.

For uplink power control, target values of received power of respective channels are configured by the base station, and the values are typically determined by the average throughput of a cell, the throughput at the edge of the cell and other factors. If the target value of received power configured is higher, then it means high power at which the uplink signal of the UE in the current cell arrives at a receiver of the base station to thereby facilitate improved performance of uplink transmission by the UE in the current cell (particularly a UE at the edge of the cell), but a too high target value of received power may result in adverse effects, such as increase of inter-cell interference, increase of power consumption of the UE, etc. Thus the target value of received power is of great importance for the UE to determine transmit power.

In the step 42, the network-side device notifies the UE of the configured respective sets of uplink power control parameters for the UE to determine transmit power of the uplink signal.

In the first embodiment of the invention, the network-side device can notify the UE of the configured respective sets of uplink power control parameters in higher-layer signaling without limitation thereto, so that the UE can select one of the received respective sets of uplink power control parameters for determination of transmit power of the uplink signal.

The following description will be given in details of how the network-side device configures the uplink signal of the UE with at least two sets of uplink power control parameters.

In the first embodiment of the invention, the network-side device can configure the uplink signal of the UE with at least two sets of uplink power control parameters dependent upon an interference condition in an uplink sub-frame.

Particularly there are two types of uplink sub-frames in the dynamic TDD system, which include fixed uplink sub-frames and those sub-frames among flexible sub-frames allocated for uplink transmission (flexible uplink sub-frames). There may be different interference conditions in these two types of uplink sub-frames, where the interference condition in the first type of uplink sub-frames is the same as that in the traditional TD-LTE system because a current cell will be subjected only to interference of uplink transmission of an adjacent cell; and in the second type of uplink sub-frames, uplink transmission of the current cell may be subjected to persistent interference of downlink transmission of the adjacent cell at a significantly higher interference level than that in the first type of uplink sub-frames, and moreover since uplink or downlink transmission is performed flexibly by the adjacent cell in the respective ones of the second type of uplink sub-frames, there may also be significantly different interference conditions between the respective sub-frames.

As can be apparent from the description above, the interference condition in the fixed uplink sub-frames is different from that in the flexible uplink sub-frames and the interference conditions in the respective flexible sub-frames are also possibly different, and in view of this, two particular implementations for configuring sets of uplink power control parameters are proposed in the first embodiment of the invention:

In a first implementation, the network-side device configures the uplink signal of the UE with at least one set of uplink power control parameters respectively for each sub-frame type of uplink sub-frame, where the sub-frame types of uplink sub-frames include flexible uplink sub-frames and fixed uplink sub-frames, that is, the network-side device configures the UE with at least one set of uplink power control parameters of the uplink signal for the fixed uplink sub-frames and also configures the UE with at least one set of uplink power control parameters of the uplink signal for the flexible uplink sub-frames, so that the fixed uplink sub-frames and the flexible uplink sub-frames correspond respectively to at least one set of uplink power control parameters. When the UE transmits the uplink signal in an uplink sub-frame which is a fixed uplink sub-frame, then the UE can select one of the at least one set of uplink power control parameters corresponding to the fixed uplink sub-frames to thereby determine transmit power of the uplink signal; and when the UE transmits the uplink signal in an uplink sub-frame which is a flexible uplink sub-frame, then the UE can select one of the at least one set of uplink power control parameters corresponding to the flexible uplink sub-frames to thereby determine transmit power of the uplink signal.

In the first implementation, for the fixed uplink sub-frames, the network-side device can configure the UE with a set of uplink power control parameters of the uplink signal and for the flexible uplink sub-frames, the network-side device can also configure the UE with a set of uplink power control parameters of the uplink signal. If the uplink signal is a PUCCH, then the network-side device configures the UE with two sets of PO_PUCCH corresponding to the PUCCH, i.e., PO_PUCCH_s1 and PO_PUCCH_s2, where PO_PUCCH_s1 corresponds to the fixed uplink sub-frames, and PO_PUCCH_s2 corresponds to the flexible uplink sub-frames, and when the UE transmits the PUCCH, the UE can determine transmit power in a fixed uplink sub-frame from PO_PUCCH_s1 and determine transmit power in a flexible uplink sub-frame from PO_PUCCH_s2. If the uplink signal is a PUSCH, then the network-side device configures the UE with two sets of PO_PUCCH(j), i.e., PO_PUSCH_s1(j) and PO_PUSCH_s2(j), where PO_PUSCH_s1(j) corresponds to the fixed uplink sub-frames, and PO_PUSCH_s2(j) corresponds to the flexible uplink sub-frames, and when the UE transmits the PUSCH, the UE can determine transmit power in a fixed uplink sub-frame from PO_PUSCH_s1(j) and determine transmit power in a flexible uplink sub-frame from PO_PUSCH_s2(j).

Moreover in the first implementation, in order for the UE to be able to select a set of uplink power control parameters according to a sub-frame type of a sub-frame, in which the uplink signal is transmitted, to thereby determine transmit power, the first embodiment of the invention proposes that in addition to notifying the UE of the configured respective sets of uplink power control parameters, the network-side device can further transmit a correspondence relationship between sub-frame types and sets of uplink power control parameters to the UE.

In a second implementation, the network-side device groups the respective uplink sub-frames into respective sets of sub-frames, more particularly the network-side device groups the fixed uplink sub-frames into a set of sub-frames and groups the flexible uplink sub-frames into at least one set of sub-frames. And then the network-side device configures the UE with at least one set of uplink power control parameters of the uplink signal respectively for each set of sub-frames as a result of grouping, that is, each set of sub-frames corresponds respectively to at least one set of uplink power control parameters. When the UE transmits the uplink signal, the UE can select one of the at least one set of uplink power control parameters corresponding to the set of sub-frames, to which an uplink sub-frame in which the uplink signal is transmitted belongs, to thereby determine transmit power of the uplink signal.

In the second implementation, the network-side device can configure the UE with a set of uplink power control parameters of the uplink signal respectively for each set of sub-frames as a result of grouping. The flexible sub-frames can be grouped by the network-side device dependent upon the number of flexible sub-frames or interference conditions in the flexible sub-frames. Taking the dynamic configuration scheme of uplink and downlink sub-frames illustrated in FIG. 2 as an example, the flexible sub-frames includes four sub-frames (the sub-frame #3, the sub-frame #4, the sub-frame #8 and the sub-frame #9), and the network-side device groups the flexible sub-frames into four sets of sub-frames, each of which includes a sub-frame, so that the network-side device determines five sets of sub-frames in total, and thus the network-side device configures the UE with five separate sets of uplink power control parameters in total, each of which corresponds to a different set of sub-frames.

If the uplink signal is a PUCCH, then the network-side device configures the UE with N sets of PO_PUCCH corresponding to the PUCCH, i.e., PO_PUCCH_s1, PO_PUCCH_sN, where N represents the number of sets of uplink power control parameters, and if each set of sub-frames corresponds to a set of uplink power control parameters, then N also represents the number of sets of sub-frames, and when the UE transmits the PUCCH, the UE can determine transmit power from the set of uplink power control parameters corresponding to the set of sub-frames to which an uplink sub-frame in which the PUCCH is transmitted belongs. If the uplink signal is a PUSCH, then the network-side device configures the UE with N sets of PO_PUSCH(j), i.e., PO_PUSCH_s1 (j), . . . , PO_PUSCH_sN(j), and when the UE transmits the PUSCH, the UE can determine transmit power from the set of uplink power control parameters corresponding to the set of sub-frames to which an uplink sub-frame in which the PUSCH is transmitted belongs.

Moreover in the second implementation, in order for the UE to be able to select a set of uplink power control parameters according to a set of sub-frames, to which a sub-frame in which the uplink signal is transmitted belongs, to thereby determine transmit power. As proposed by the first embodiment of the invention, in addition to notifying the UE of the configured respective sets of uplink power control parameters, the network-side device can further transmit a correspondence relationship between sets of sub-frames and sets of uplink power control parameters to the UE.

If the uplink signal is a PUSCH, then when the network-side device configures sets of uplink power control parameters, the network-side device can configure N parameter values respectively for at least one uplink power control parameter of the PUSCH, where N represents the number of sets of uplink power control parameters to be configured, and can configure only one parameter value for the other uplink power control parameters of the PUSCH, and particularly:

The network-side device selects PO_PUSCH(k) among the target values of received power of the respective categories of PUSCHs, where k is at least one of 0, 1 and 2, and for selected PO_PUSCH(k), the network-side device configures the UE with parameter values PO_PUSCH_s1(k), PO_PUSCH_sN(k), where N represents the number of sets of uplink power control parameters to be configured.

Where the network-side device can select PO_PUSCH(k) in the following seven patterns in total:

{PO_PUSCH(0)}; {PO_PUSCH(1)}; {PO_PUSCH(2)}; {PO_PUSCH(0) and PO_PUSCH(1)}; {PO_PUSCH(0) and PO_PUSCH(2)}; {PO_PUSCH(1) and PO_PUSCH(2)}; and {PO_PUSCH(0), PO_PUSCH(1) and PO_PUSCH(2)} respectively.

For the other unselected PO_PUSCHs, the network-side device can configure an unselected PO_PUSCH with a parameter value instead of N parameter values, and there are uniform parameter values for the unselected PO_PUSCH in the respective sets of uplink power control parameters. For example, if PO_PUSCH(1) is not selected by the network-side device, then there is a uniform value of PO_PUSCH(1) in the N sets of uplink power control parameters.

A target value of received power of the uplink signal can include a cell-specific component and a UE-specific component. For example, a target value PO_PUCCH of received power of a PUCCH is the sum of a cell-specific component PO_NOMINAL_PUCCH and a UE-specific component PO_UE_PUCCH, and a target value PO_PUSCH(j) of received power of a PUSCH is the sum of a cell-specific component PO_NOMINAL_PUSCH(j) and a UE-specific component PO_UE_PUSCH(j). As proposed in the first embodiment of the invention, for the respective uplink power control parameters, the network-side device can configure the cell-specific components respectively with N parameter values, where N represents the number of sets of uplink power control parameters to be configured, and configure the UE-specific components only with a parameter value. For example, when N=2, PO_NOMINAL_PUSCH(j) is configured with two parameter values PO_NOMINAL_PUSCH_s1(j) and PO_NOMINAL_PUSCH_S2(j), at this time PO_PUSCH_S1(j)=PO_NOMINAL_PUSCH_S1(j)+PO_UE_PUSCH(j) and PO_PUSCH_S2(j)=PO_NOMINAL_PUSCH_S2(j)+PO_UE_PUSCH(j). Or the network-side device can configure the UE-specific components respectively with N parameter values and configure the cell-specific components only with a parameter value. For example, when N=2, PO_UE_PUSCH(j) is configured with two parameter values PO_UE_PUSCH_s1(j) and PO_UE_PUSCH_S2(j), and at this time PO_PUSCH_S1(j)=PO_NOMINAL_PUSCH(j)+PO_UE_PUSCH_S1(j) and PO_PUSCH_S2(j)=PO_NOMINAL_PUSCH(j)+PO_UE_PUSCH_S2(j). Or the network-side device can configure the cell-specific components and the UE-specific components respectively with N parameter values. For example, when N=2, PO_NOMINAL_PUSCH(j) is configured with two parameter values PO_NOMINAL_PUSCH_s1(j) and PO_NOMINAL_PUSCH_S2(j), and PO_UE_PUSCH(j) is configured with two parameter values PO_UE_PUSCH_S1(j) and PO_UE_PUSCH_S2(j), at this time PO_PUSCH_S1(j)=PO_NOMINAL_PUSCH_S1(j)+PO_UE_PUSCH_S1(j) and PO_PUSCH_S2(j)=PO_NOMINAL_PUSCH_S2(j)+PO_UE_PUSCH_S2(j).

As proposed in the first embodiment of the invention, the parameter values of the uplink power control parameters in the respective sets of uplink power control parameters configured by the network-side device can be real parameter values or relative parameter values. Wherein the parameter values in each set of uplink power control parameters can be real parameter values. Moreover the network-side device can alternatively pre-select a reference set of uplink power control parameters, and only the parameter values in the reference set of uplink power control parameters are real parameter values, whereas the parameter values in the other sets of uplink power control parameters are the differences of their real parameter values from the real parameter values in the reference set of uplink power control parameters, referred to as relative parameter values.

Moreover as further proposed in the first embodiment of the invention, if the network-side device selects one of the sets of uplink power control parameters for the UE and notifies the UE of the set of uplink power control parameters, then the UE can determine transmit power from the set of uplink power control parameters selected by the network-side device directly without selecting any set of uplink power control parameters, and particularly when the UE transmits the uplink signal, the network-side device selects one of the configured respective sets of uplink power control parameters for the UE and transmits the set identifier of the selected set of uplink power control parameters to the UE.

Where the network-side device can transmit the set identifier of the selected set of uplink power control parameters to the UE over a PDCCH without limitation thereto.

In correspondence to the first implementation above, when the network-side selects one of the sets of uplink power control parameters, the network-side device can firstly determine a sub-frame type of an uplink sub-frame in which the UE transmits the uplink signal and then select one set of uplink power control parameters corresponding to the determined sub-frame type among the configured respective sets of uplink power control parameters. If the determined sub-frame type is a fixed uplink sub-frame, then the network-side device selects one of the sets of uplink power control parameters configured for the fixed uplink sub-frames for the UE, or if the determined sub-frame type is a flexible uplink sub-frame, then the network-side device selects one of the sets of uplink power control parameters configured for the flexible uplink sub-frames for the UE.

In correspondence to the second implementation above, when the network-side selects one of the sets of uplink power control parameters, the network-side device can firstly determine a set of sub-frames of an uplink sub-frame in which the UE transmits the uplink signal and then select one set of uplink power control parameters corresponding to the determined set of sub-frames among the configured respective sets of uplink power control parameters.

For example, the uplink signal is a PUSCH, and the network-side device carries the set identifier of the set of uplink power control parameters in a PDCCH of physical layer signaling, to indicate the specific set of uplink power control parameters from which the UE determines transmit power for the PUSCH scheduled by the PDCCH, where the set identifier can occupy a bit of the PDCCH, but the invention will not be limited thereto.

In the first embodiment of the invention, the network-side device can configure each UE respectively with at least two sets of uplink power control parameters and then notify the corresponding UE of the configured sets of uplink power control parameters; or the network-side device can configure all the UEs with at least two sets of uplink power control parameters and then notify all the UEs of the configured respective sets of uplink power control parameters.

Second Embodiment

Figure 5:
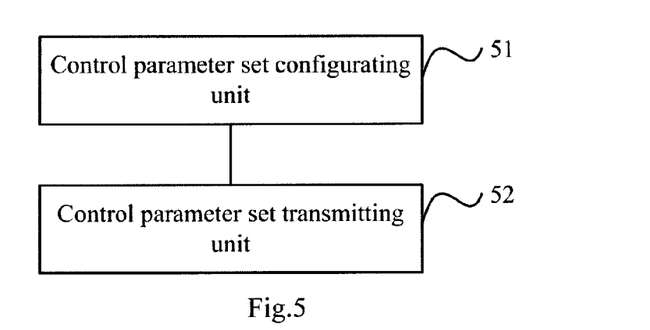
FIG. 5 illustrates a schematic structural diagram of a network-side device according to a second embodiment of the invention.

Based upon the uplink power control method according to the first embodiment of the invention, a second embodiment of the invention proposes a network-side device, the structure of which is as illustrated in FIG. 5, where the network-side device includes:

A set of control parameters configuration unit 51 is configured to configure an uplink signal of a UE with at least two sets of uplink power control parameters; and A set of control parameters transmission unit 52 is configured to notify the UE of the respective sets of uplink power control parameters configured by the set of control parameters configuration unit 51 for the UE to determine transmit power of the uplink signal.

In a preferred implementation of the second embodiment of the invention, the set of control parameters transmission unit 52 is particularly configured to notify the UE of the respective sets of uplink power control parameters configured by the set of control parameters configuration unit 51 in higher-layer signaling.

In a preferred implementation of the second embodiment of the invention, the set of control parameters configuration unit 51 is particularly configured to configure the uplink signal of the UE with the at least two sets of uplink power control parameters dependent upon interference conditions in uplink sub-frames.

In a further preferred implementation of the second embodiment of the invention, the set of control parameters configuration unit 51 is particularly configured to configure the uplink signal of the UE with at least one set of uplink power control parameters respectively for each sub-frame type of uplink sub-frame, where the sub-frame types of uplink sub-frames include flexible uplink sub-frames and fixed uplink sub-frames.

In a further preferred implementation of the second embodiment of the invention, the network-side device further includes a first correspondence relationship transmission unit configured to transmit a correspondence relationship between sub-frame types and sets of uplink power control parameters to the UE.

In a further preferred implementation of the second embodiment of the invention, the set of control parameters configuration unit 51 includes:

A sub-frame grouping sub-unit is configured to group the fixed uplink sub-frames into a set of sub-frames and to group the flexible sub-frames into at least one set of sub-frames; and A first set of control parameters configuration sub-unit is configured to configure the uplink signal of the UE with at least one set of uplink power control parameters respectively for each set of sub-frames as a result of grouping by the sub-frame grouping sub-unit.

In a further preferred implementation of the second embodiment of the invention, the network-side device further includes a second correspondence relationship transmission unit configured to transmit a correspondence relationship between sets of sub-frames and sets of uplink power control parameters to the UE.

In a preferred implementation of the second embodiment of the invention, the network-side device further includes:

A set of control parameters selection unit is configured to select one of the respective sets of uplink power control parameters configured by the set of control parameters configuration unit 51 for the UE when the UE transmits the uplink signal; and A set of control parameters transmission unit is configured to transmit the set identifier of the set of uplink power control parameters selected by the set of control parameters selection unit to the UE.

In a further preferred implementation of the second embodiment of the invention, each sub-frame type of uplink sub-frame corresponds respectively to at least one set of uplink power control parameters, where the sub-frame types of uplink sub-frames include flexible uplink sub-frames and fixed uplink sub-frames; and The set of control parameters selection unit includes:

A sub-frame type determination sub-unit is configured to determine a sub-frame type of an uplink sub-frame in which the UE transmits the uplink signal; and A first set of control parameters selection sub-unit is configured to select a set of uplink power control parameters, corresponding to the sub-frame type determined by the sub-frame type determination sub-unit, among the respective sets of uplink power control parameters configured by the set of control parameters configuration unit 51.

In a further preferred implementation of the second embodiment of the invention, each set of uplink sub-frames corresponds respectively to at least one set of uplink power control parameters, where the fixed uplink sub-frames correspond to a set of sub-frames, and the flexible uplink sub-frames correspond to at least one set of sub-frames; and The set of control parameters selection unit includes:

A set of sub-frames determination sub-unit is configured to determine a set of sub-frames to which an uplink sub-frame, in which the UE transmits the uplink signal, belongs; and A second set of control parameters selection sub-unit is configured to select a set of uplink power control parameters, corresponding to the set of sub-frame determined by the set of sub-frame determination sub-unit, among the respective sets of uplink power control parameters configured by the set of control parameters configuration unit 51.

In a further preferred implementation of the second embodiment of the invention, the set of control parameters transmission unit is particularly configured to transmit the set identifier of the set of uplink power control parameters selected by the set of control parameters selection unit to the UE over a PDCCH.

In a preferred implementation of the second embodiment of the invention, the uplink power control parameters of the uplink signal are target values of received power of the uplink signal.

In a preferred implementation of the second embodiment of the invention, the uplink signal is a PUSCH, or a PUCCH or an SRS.

In a further preferred implementation of the second embodiment of the invention, the uplink signal is a PUSCH, and the uplink power control parameters of the uplink signal are target values PO_PUSCH(j) of received power of respective categories of PUSCHs, where j represents the category identifier of PUSCH and takes the values of 0, 1 or 2.

The set of control parameters configuration unit 51 includes:

A target value selection sub-unit is configured to select PO_PUSCH(k) among the target values of received power of the respective categories of PUSCHs, where k is at least one of 0, 1 or 2; and A second set of control parameters configuration sub-unit is configured, for PO_PUSCH(k) selected by the target value selection sub-unit, to configure the UE with parameter values PO_PUSCH_s1(k), . . . , PO_PUSCH_sN(k), where N represents the number of sets of uplink power control parameters to be configured.

The uplink power control process at the UE side will be described below.

Third Embodiment

Figure 6:
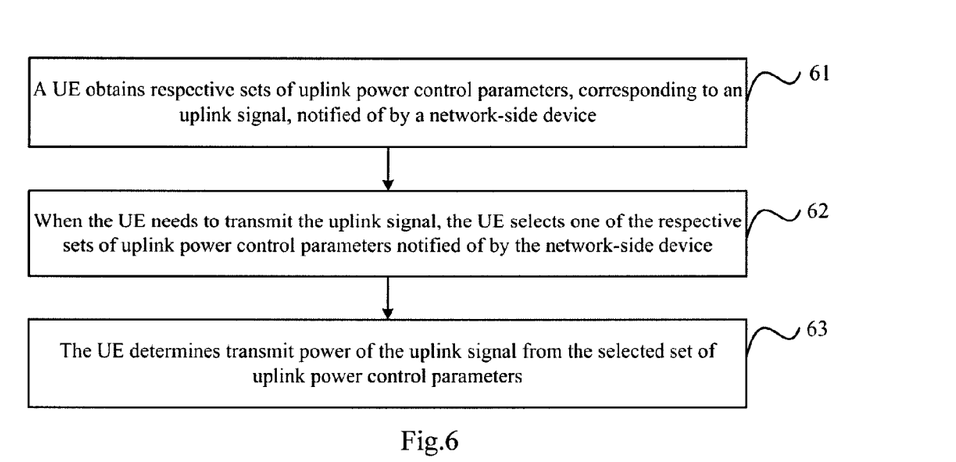
FIG. 6 illustrates a schematic flow chart of an uplink power control method at the UE side according to a third embodiment of the invention.

As illustrated in FIG. 6 which is a flow chart of an uplink power control method at the UE side according to a third embodiment of the invention, a particular process flow thereof is as follows:

In the step 61, a UE obtains respective sets of uplink power control parameters, corresponding to an uplink signal, notified of by a network-side device.

Where the UE can obtain the respective sets of uplink power control parameters, corresponding to the uplink signal, notified of by the network-side device in higher-layer signaling, but the invention will not be limited thereto.

A repeated description of a process in which the network-side device configures and transmits the sets of uplink power control parameters will be omitted here.

In the step 62, when the UE needs to transmit the uplink signal, the UE selects one of the respective sets of uplink power control parameters notified of by the network-side device.

The UE can select one of the sets of uplink power control parameters in the following three implementations without limitation thereto:

In a first implementation, the UE receives a correspondence relationship, between sub-frame types and sets of uplink power control parameters, transmitted by the network-side device, determines a sub-frame type of an uplink sub-frame in which the uplink signal is transmitted, where the sub-frame types include flexible uplink sub-frames and fixed uplink sub-frames, and then the UE selects a set of uplink power control parameters corresponding to the determined sub-frame type among the respective sets of uplink power control parameters notified of by the network-side device according to the received correspondence relationship between sub-frame types and sets of uplink power control parameters.

If the UE transmits the uplink signal in an uplink sub-frame which is a fixed uplink sub-frame, then the UE can know respective sets of uplink power control parameters corresponding to the fixed uplink sub-frame according to the received correspondence relationship between sub-frame types and sets of uplink power control parameters, and the UE can select one of the respective sets of uplink power control parameters corresponding to the fixed uplink sub-frame; or if the UE transmits the uplink signal in an uplink sub-frame which is a flexible uplink sub-frame, then the UE can know respective sets of uplink power control parameters corresponding to the flexible uplink sub-frame according to the received correspondence relationship between sub-frame types and sets of uplink power control parameters, and the UE can select one of the respective sets of uplink power control parameters corresponding to the flexible uplink sub-frame.

In a second implementation, the UE receives a correspondence relationship, between sets of sub-frames and sets of uplink power control parameters, transmitted by the network-side device, determines a set of sub-frames to which an uplink sub-frame in which the uplink signal is transmitted belongs, where fixed uplink sub-frames correspond to a set of sub-frames, and flexible uplink sub-frames correspond to at least one set of sub-frames, and then the UE selects a set of uplink power control parameters corresponding to the determined set of sub-frames among the respective sets of uplink power control parameters notified of by the network-side device according to the received correspondence relationship between sets of sub-frames and sets of uplink power control parameters.

After the UE determines the set of sub-frames to which the uplink sub-frame in which the uplink signal is transmitted belongs, the UE can know sets of uplink power control parameters corresponding to the determined set of sub-frames according to the correspondence relationship between sets of sub-frames and sets of uplink power control parameters, and the UE can select one of the sets of uplink power control parameters corresponding to the determined set of sub-frames.

In a third implementation, the UE receives the set identifier of a set of uplink power control parameters transmitted by the network-side device and then selects the corresponding set of uplink power control parameters among the respective sets of uplink power control parameters notified of by the network-side device directly according to the received set identifier.

Where the UE can receive the set identifier of the set of uplink power control parameters transmitted by the network-side device over a PDCCH without limitation thereto.

In the step 63, the UE determines transmit power of the uplink signal from the selected set of uplink power control parameters.

Methods of determining transmit power of a PUCCH, a PUSCH and an SRS will be described below.

1. Method of Determining the Transmit Power of PUCCH

In the LTE system, the transmit power of a PUCCH is calculated by the UE, particularly from a parameter configuration of the base station and the format of the PUCCH channel as follows:

Transmit power PPUCCH, at which the UE transmits the PUCCH channel in an uplink sub-frame I, can be calculated in the equation of:

$$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases},$$

Where:

$P_{CMAX,c}(i)$ represents a highest transmit power of the UE configured by the higher layer;

The parameter $\Delta_{F\_PUCCH}(F)$ is configured by the higher layer and corresponds to a power offset of a different PUCCH format from the PUCCH format 1a, where the PUCCH formats include formats 1/1a/1b/2/2a/2b, etc.;

$h(n_{CQI}, n_{HARQ}, n_{SR})$ represents a power offset related to the number of bits carried over the PUCCH, where $n_{CQI}$ corresponds to the number of bits in which a Channel Quality Indicator (CQI) is carried, $n_{HARQ}$ corresponds to the number of bits in which an Acknowledgement (ACK)/Negative-Acknowledgement (NACK) is carried, and if the UE has no data to be transmitted in the uplink, then nSR is 1; otherwise, nSR is 0

$\Delta_{TxD}(F')$ represents a amount of power adjustment applied in PUCCH transmit diversity and is configured by the higher layer;

PLC represents a downlink path loss measured by the UE; and g(i) represents an accumulated amount of a power control command word, where the power control command word is transmitted over the PDCCH, the unit of which is dB, the power control command word of the PUCCH is accumulative, and the range of values for the power control command word is [−1,0,1,3] or [−1,1].

2. Method of Determining the Transmit Power of PUSCH

In the LTE system, the transmit power of a PUSCH is calculated by the UE, particularly from a parameter configuration of the base station and a scheduling condition of the PUSCH as follows:

Transmit power $P_{PUSCH,c}(i)$, at which the UE transmits the PUSCH channel over a component carrier c in an uplink sub-frame i, can be calculated in the equation of:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

Where:

$P_{CMAX,c}(i)$ represents an allowable highest transmit power determined by the level of the UE and is configured by the higher layer;

$M_{PUSCH,c}(i)$ is the size of a resource, allocated for the PUSCH, over the component carrier c of the uplink sub-frame i and can be represented in the number of resource blocks;

When j=0 or 1, $\alpha_c \in \{0, 0.4, 0.5, 0.6, 0.7, 0.8, 0.9, 1\}$ represents path loss compensation factors which are a cell-specific parameter and are indicated in 3 bits of high-layer signaling; and when j=2, $\alpha_c(j)=1$, i.e., full path loss compensation is used for transmission of the PUSCH with a random access message 3 all the time;

PLC represents a downlink path loss measured by the UE;

When $K_s=1.25$, $\Delta_{TF,c}(i)=\log_{10}((2^{BPRE \cdot K_s}-1) \cdot \beta_{offset}^{PUSCH})$ represents a different power offset corresponding to a different Modulation and Coding Scheme (MCS); and when $K_s=0$, $\Delta_{TF,c}(i)=0$ represents a disabled function of adjusting power to the MCS, where $K_s$ represents UE-specific parameter indicated in higher-layer signaling; and $\delta_{PUSCH,c}$ is a UE-specific corrected value, also referred to a Transmission power Control (TPC) command, the unit being dB, which is included in a PDCCH in the Downlink Control Information (DCI) format 0/4 or in a PDCCH in the DCI format 3/3a and encoded jointly with another TPC command, where a current PUSCH power control adjustment status is defined by f(i) and includes an accumulated manner or absolute value manner, and the range of values for the power control command word is [−1,0,1,3] or [−1,1] respectively in the accumulated manner, and the range of values for the power control command word is [−4,−1,1,4] in the absolute value manner.

3. Method of Determining the Transmit Power of SRS

Similarly to the PUSCH, in the LTE system, transmit power of an SRS is calculated by the UE, particularly from a parameter configuration of the base station and a scheduling condition of the SRS as follows:

Transmit power $P_{SRS,c}(i)$, at which the UE transmits the SRS channel over a component carrier c in an uplink sub-frame i, can be calculated in the equation of:

$$P_{SRS,c}(i) = \min\{P_{CMAX,c}(i), P_{SRS\_OFFSET,c}(m) + 10\log_{10}(M_{SRS,c}) + P_{O\_PUSH,c}(j) + \alpha_c(j) \cdot PL_c + f_c(i)\},$$

Where:

$P_{SRS\_OFFSET,c}(m)$ represents a adjustment value of transmit power of the SRS;

$M_{SRS,c}$ represents a transmission bandwidth of the SRS; and

The other parameters are the same as those used in determination of transmit power of the PUSCH.

As can be apparent from the process flow above, in the technical solution according to the embodiment of the invention, the network-side device configures an uplink signal of the UE with at least two sets of uplink power control parameters and notifies the UE of the configured respective sets of uplink power control parameters. When the UE needs to transmit the uplink signal, the UE can select one of the respective sets of uplink power control parameters notified of by the network-side device and determine transmit power of the uplink signal from the selected set of uplink power control parameters. In the dynamic TDD system, the UE can transmit an uplink signal in different uplink sub-frames and the UE can determine transmit power, at which the uplink signal is transmitted, from the different sets of uplink power control parameters, so that the different uplink sub-frames can correspond to different transmit power to thereby ensure the performance of transmission by the UE in the respective uplink sub-frames of the dynamic TDD system. Moreover in the technical solutions according to the embodiments of the invention, at least two sets of uplink power control parameters can be configured at the network side instead of adjusting transmit power by a power control command word to thereby accommodate a dynamic demand for traffic, and moreover respective UEs will not be configured with a uniform uplink power control parameter to thereby avoid power consumption of the UEs and inter-cell interference so as to control flexibly uplink transmit power.

Fourth Embodiment

Figure 7:
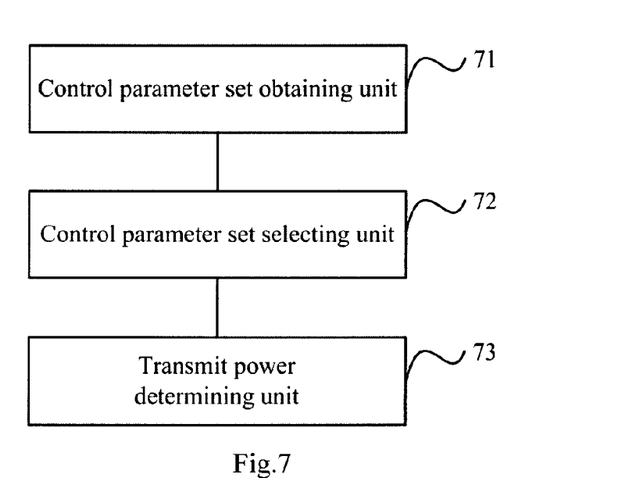
FIG. 7 illustrates a schematic structural diagram of a UE according to a fourth embodiment of the invention.

Based upon the uplink power control method according to the third embodiment of the invention, a fourth embodiment of the invention proposes a user equipment, the structure of which is as illustrated in FIG. 7, the user equipment including:

A set of control parameters obtainment unit 71 is configured to obtain respective sets of uplink power control parameters, corresponding to an uplink signal, notified of by a network-side device;

A set of control parameters selection unit 72 is configured to select one of the respective sets of uplink power control parameters obtained by the set of control parameters obtainment unit 71 when the uplink signal needs to be transmitted; and A transmit power determination unit 73 is configured to determine transmit power of the uplink signal from the set of uplink power control parameters selected by the set of control parameters selection unit 72.

In a preferred embodiment of the fourth embodiment of the invention, the set of control parameters obtainment unit 71 is particularly configured to obtain the respective sets of uplink power control parameters, corresponding to the uplink signal, notified of by the network-side device in higher-layer signaling.

In a preferred embodiment of the fourth embodiment of the invention, the set of control parameters selection unit 72 includes:

A first correspondence relationship reception sub-unit is configured to receive a correspondence relationship, between sub-frame types and sets of uplink power control parameters, transmitted from the network-side device;

A sub-frame type determination sub-unit is configured to determine a sub-frame type of an uplink sub-frame, in which the uplink signal is transmitted, where the sub-frame types include flexible uplink sub-frames and fixed uplink sub-frames; and A first set of control parameters selection sub-unit is configured to select a set of uplink power control parameters, corresponding to the sub-frame type determined by the sub-frame type determination sub-unit, among the respective sets of uplink power control parameters obtained by the set of control parameters obtainment unit 71 according to the correspondence relationship, between sub-frame types and sets of uplink power control parameters, received by the first correspondence relationship reception sub-unit.

In a preferred embodiment of the fourth embodiment of the invention, the set of control parameters selection unit 72 includes:

A second correspondence relationship reception sub-unit is configured to receive a correspondence relationship, between sets of sub-frames and sets of uplink power control parameters, transmitted from the network-side device;

A set of sub-frames determination sub-unit is configured to determine a set of sub-frames to which an uplink sub-frame, in which the uplink signal is transmitted, belongs, where fixed uplink sub-frames correspond to a set of sub-frames, and flexible uplink sub-frames correspond to at least one set of sub-frames; and A second set of control parameters selection sub-unit is configured to select a set of uplink power control parameters, corresponding to the set of sub-frames determined by the set of sub-frames determination sub-unit, among the respective sets of uplink power control parameters obtained by the set of control parameters obtainment unit 71 according to the correspondence relationship, between sets of sub-frames and sets of uplink power control parameters, received by the second correspondence relationship reception sub-unit.

In a preferred embodiment of the fourth embodiment of the invention, the set of control parameters selection unit 72 includes:

A set identifier reception sub-unit is configured to receive the set identifier of a set of uplink power control parameters transmitted from the network-side device; and A third set of control parameters selection sub-unit is configured to select the corresponding set of uplink power control parameters among the respective sets of uplink power control parameters obtained by the set of control parameters obtainment unit 71 according to the set identifier received by the set identifier reception sub-unit.

In a preferred embodiment of the fourth embodiment of the invention, the set identifier reception sub-unit is particularly configured to receive the set identifier of the set of uplink power control parameters transmitted from the network-side device over a PDCCH.

In a preferred embodiment of the fourth embodiment of the invention, the uplink power control parameters of the uplink signal are target values of received power of the uplink signal.

In a preferred embodiment of the fourth embodiment of the invention, the uplink signal is a PUCCH, or a PUSCH or an SRS.

Fifth Embodiment

Based upon the uplink power control method at the network side according to the first embodiment of the invention and the uplink power control method at the UE side according to the third embodiment of the invention, a fifth embodiment of the invention proposes an uplink power control system including a network-side device and a UE, where:

The network-side device is configured to configure an uplink signal of the UE with at least two uplink power control parameters and to notify the UE of the configured respective sets of uplink power control parameters; and The UE is configured to, when the UE needs to transmit the uplink signal, select one of the respective sets of uplink power control parameters notified of by the network-side device and to determine transmit power of the uplink signal from the selected set of uplink power control parameters.

Where the network-side device can be but will not be limited to a base station.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An uplink power control method, comprising:
configuring, by a network-side device, an uplink signal of a user equipment with at least two sets of uplink power control parameters; and
notifying the user equipment of the configured respective sets of uplink power control parameters for the user equipment to determine transmit power of the uplink signal;
wherein the uplink signal is a Physical Uplink Shared Channel (PUSCH), or a Physical Uplink Control Channel (PUCCH) or a Sounding Reference Signal (SRS);
when the uplink signal is the PUSCH, and the uplink power control parameters of the uplink signal are target values PO_PUSCH(j) of received power of respective categories of PUSCHs, and wherein j represents a category identifier of PUSCH and takes the values of 0, 1 or 2; and
configuring, by the network-side device, the uplink signal of the user equipment with the at least two sets of uplink power control parameters further comprises:
selecting, by the network-side device, PO_PUSCH(k) among the target values of received power of the respective categories of PUSCHs, wherein k is at least one of 0, 1 and 2; and
for selected PO_PUSCH(k), configuring, by the network-side device, the user equipment with parameter values PO_PUSCH s1(k), . . . , PO_PUSCH_sN(k), wherein N represents the number of sets of uplink power control parameters to be configured.

2. The method according to claim 1, wherein notifying the user equipment of the configured respective sets of uplink power control parameters particularly comprises:
notifying the user equipment of the configured respective sets of uplink power control parameters in higher-layer signaling.

3. The method according to claim 1, wherein configuring, by the network-side device, the uplink signal of the user equipment with the at least two sets of uplink power control parameters particularly comprises:
configuring, by the network-side device, the uplink signal of the user equipment with the at least two sets of uplink power control parameters dependent upon interference conditions in uplink sub-frames.

4. The method according to claim 3, wherein configuring, by the network-side device, the uplink signal of the user equipment with the at least two sets of uplink power control parameters dependent upon the interference conditions in the uplink sub-frames particularly comprises:
configuring, by the network-side device, the uplink signal of the user equipment with at least one set of uplink power control parameters respectively for each sub-frame type of uplink sub-frame, wherein the sub-frame types of uplink sub-frames comprise flexible uplink sub-frames and fixed uplink sub-frames.

5. The method according to claim 4, further comprising:
transmitting, by the network-side device, a correspondence relationship between sub-frame types and sets of uplink power control parameters to the user equipment.

6. The method according to claim 3, wherein configuring, by the network-side device, the uplink signal of the user equipment with the at least two sets of uplink power control parameters dependent upon the interference conditions in the uplink sub-frames particularly comprises:
grouping, by the network-side device, uplink sub-frames into at least one set of sub-frames; and
configuring the uplink signal of the user equipment with at least one set of uplink power control parameters respectively for each set of sub-frames as a result of grouping.

7. The method according to claim 6, wherein grouping, by the network-side device, uplink sub-frames into at least one set of sub-frames particularly comprises:
grouping, by the network-side device, fixed uplink sub-frames into a set of sub-frames and grouping flexible uplink sub-frames into at least one set of sub-frames.

8. The method according to claim 6, further comprising:
transmitting, by the network-side device, a correspondence relationship between sets of sub-frames and sets of uplink power control parameters to the user equipment.

9. The method according to claim 1, further comprising:
when the user equipment transmits the uplink signal, selecting, by the network-side device, one of the configured respective sets of uplink power control parameters for the user equipment; and
transmitting a set identifier of the selected set of uplink power control parameters to the user equipment.

10. A network-side device, comprising:
a set of control parameters configuration unit, configured to configure an uplink signal of a user equipment with at least two sets of uplink power control parameters; and
a set of control parameters transmission unit, configured to notify the user equipment of the respective sets of uplink power control parameters configured by the set of control parameters configuration unit, for the user equipment to determine transmit power of the uplink signal;
wherein the uplink signal is a Physical Uplink Shared Channel (PUSCH), or a Physical Uplink Control Channel (PUCCH) or a Sounding Reference Signal (SRS);
when the uplink signal is the PUSCH, and the uplink power control parameters of the uplink signal are target values PO_PUSCH(j) of received power of respective categories of PUSCHs, and wherein j represents a category identifier of PUSCH and takes the values of 0, 1 or 2; and
the set of control parameters configuration unit is configured to select PO_PUSCH(k) among the target values of received power of the respective categories of PUSCHs, wherein k is at least one of 0, 1 and 2; and for selected PO_PUSCH(k), configure the user equipment with parameter values PO_PUSCH s1(k), . . . , PO_PUSCH_sN(k), wherein N represents the number of sets of uplink power control parameters to be configured.

11. An uplink power control method, comprising:
obtaining, by a user equipment, respective sets of uplink power control parameters, corresponding to an uplink signal, notified of by a network-side device;
when the user equipment needs to transmit the uplink signal, selecting, by the user equipment, one of the respective sets of uplink power control parameters obtained by the network-side device; and
determining transmit power of the uplink signal from the selected set of uplink power control parameters;

wherein the uplink signal is a Physical Uplink Shared Channel (PUSCH), or a Physical Uplink Control Channel (PUCCH) or a Sounding Reference Signal (SRS);

when the uplink signal is the PUSCH, and the uplink power control parameters of the uplink signal are target values PO_PUSCH(j) of received power of respective categories of PUSCHs, and wherein j represents a category identifier of PUSCH and takes the values of 0, 1 or 2; and the respective sets of uplink power control parameters are configured for UE by:

the network-side device selecting PO_PUSCH(k) among the target values of received power of the respective categories of PUSCHs, wherein k is at least one of 0, 1 and 2; and for selected PO_PUSCH(k), the network-side device configuring the user equipment with parameter values PO_PUSCH s1(k), . . . , PO_PUSCH_sN(k), wherein N represents the number of sets of uplink power control parameters to be configured.

12. The method according to claim 11, wherein obtaining, by the user equipment, the respective sets of uplink power control parameters, corresponding to the uplink signal, notified of by the network-side device particularly comprises:

obtaining, by the user equipment, the respective sets of uplink power control parameters, corresponding to the uplink signal, notified of by the network-side device in higher-layer signaling.

13. The method according to claim 11, wherein the selecting, by the user equipment, one of the respective sets of uplink power control parameters obtained by the network-side device particularly comprises:

receiving, by the user equipment, a correspondence relationship, between sub-frame types and sets of uplink power control parameters, transmitted from the network-side device;

determining a sub-frame type of an uplink sub-frame in which the uplink signal is transmitted, wherein the sub-frame types comprise flexible uplink sub-frames and fixed uplink sub-frames; and selecting, by the user equipment, a set of uplink power control parameters corresponding to the determined sub-frame type among the respective sets of uplink power control parameters notified of by the network-side device according to the received correspondence relationship between sub-frame types and sets of uplink power control parameters.

14. The method according to claim 11, wherein the selecting, by the user equipment, one of the respective sets of uplink power control parameters notified of by the network-side device particularly comprises:

receiving, by the user equipment, a correspondence relationship, between sets of sub-frames and sets of uplink power control parameters, transmitted from the network-side device;

determining a set of sub-frames to which an uplink sub-frame, in which the uplink signal is transmitted, belongs; and selecting, by the user equipment, a set of uplink power control parameters corresponding to the determined set of sub-frames among the respective sets of uplink power control parameters notified of by the network-side device according to the received correspondence relationship between sets of sub-frames and sets of uplink power control parameters.

15. The method according to claim 14, wherein fixed uplink sub-frames correspond to a set of sub-frames, and flexible uplink sub-frames correspond to at least one set of sub-frames.

16. The method according to claim 11, wherein the selecting, by the user equipment, one of the respective sets of uplink power control parameters obtained by the network-side device particularly comprises:

receiving, by the user equipment, a set identifier of a set of uplink power control parameters transmitted from the network-side device; and selecting a corresponding set of uplink power control parameters among the respective sets of uplink power control parameters notified of by the network-side device according to the received set identifier.

17. The method according to claim 11, wherein the uplink signal is a Physical Uplink Shared Channel (PUSCH), or a Physical Uplink Control Channel (PUCCH) or a Sounding Reference Signal (SRS).

18. A user equipment, comprising:

a set of control parameters obtainment unit, configured to obtain respective sets of uplink power control parameters, corresponding to an uplink signal, notified of by a network-side device;

a set of control parameters selection unit, configured to select one of the respective sets of uplink power control parameters obtained by the set of control parameters obtainment unit when the user equipment needs to transmit the uplink signal; and a transmit power determination unit, configured to determine transmit power of the uplink signal from the set of uplink power control parameters selected by the set of control parameters selection unit;

wherein the uplink signal is a Physical Uplink Shared Channel (PUSCH), or a Physical Uplink Control Channel (PUCCH) or a Sounding Reference Signal (SRS);

when the uplink signal is the PUSCH, and the uplink power control parameters of the uplink signal are target values PO_PUSCH(j) of received power of respective categories of PUSCHs, and wherein j represents a category identifier of PUSCH and takes the values of 0, 1 or 2; and the respective sets of uplink power control parameters are configured for UE by:

the network-side device selecting PO_PUSCH(k) among the target values of received power of the respective categories of PUSCHs, wherein k is at least one of 0, 1 and 2; and for selected PO_PUSCH(k), the network-side device configuring the user equipment with parameter values PO_PUSCH s1(k), . . . , PO_PUSCH_sN(k), wherein N represents the number of sets of uplink power control parameters to be configured.

* * * * *